US009450500B2

(12) United States Patent
Zimmanck

(10) Patent No.: US 9,450,500 B2
(45) Date of Patent: Sep. 20, 2016

(54) METHOD AND APPARATUS FOR MODULATING LOWER POWERS IN RESONANT CONVERTERS

(71) Applicant: Enphase Energy, Inc., Petaluma, CA (US)

(72) Inventor: Donald Richard Zimmanck, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 106 days.

(21) Appl. No.: 14/101,572

(22) Filed: Dec. 10, 2013

(65) Prior Publication Data

US 2014/0160800 A1 Jun. 12, 2014

Related U.S. Application Data

(60) Provisional application No. 61/735,438, filed on Dec. 10, 2012.

(51) Int. Cl.
*H02M 3/335* (2006.01)
*H02M 3/337* (2006.01)
*H02M 5/293* (2006.01)
(Continued)

(52) U.S. Cl.
CPC ............ *H02M 3/3376* (2013.01); *H02M 5/293* (2013.01); *H02M 2001/007* (2013.01); *H02M 2005/2932* (2013.01); *H02M 2007/4815* (2013.01); *Y02B 70/145* (2013.01); *Y02B 70/1433* (2013.01); *Y02B 70/1441* (2013.01)

(58) Field of Classification Search
CPC .............. H02M 2001/007; H02M 2001/0058; H02M 3/335; H02M 3/337; H02M 7/5387; H02M 7/53871; H02M 5/293; H02M 5/297; H02M 2005/2932; H02M 2005/2937
USPC ................. 363/16–17, 21.03, 21.12, 132, 98
See application file for complete search history.

(56) References Cited

U.S. PATENT DOCUMENTS

| | | | | |
|---|---|---|---|---|
| 4,605,999 A | * | 8/1986 | Bowman ............... | H02M 3/338 323/248 |
| 5,594,629 A | * | 1/1997 | Steigerwald .......... | H02M 3/155 363/131 |
| 6,653,799 B2 | * | 11/2003 | Cammack .......... | H05B 41/2928 315/224 |

(Continued)

FOREIGN PATENT DOCUMENTS

| | | |
|---|---|---|
| JP | 2011160603 A | 8/2011 |
| JP | 2012120294 A | 6/2012 |
| KR | 101996003957 A | 11/1996 |

OTHER PUBLICATIONS

PCT International search report PCT/US2013/074008, Jul. 2009.

(Continued)

*Primary Examiner* — Rajnikant Patel
(74) *Attorney, Agent, or Firm* — Moser Taboada

(57) ABSTRACT

Method and apparatus for power conversion. In one embodiment, the method comprises operating a resonant converter in a ring mode comprising (i) holding a plurality of switches of the resonant converter in a first switching state throughout a pre-determined number of resonant periods; and (ii) maintaining the plurality of switches in the first switching state for a fraction of a subsequent resonant period until an amount of energy has been transferred through the resonant converter to achieve a pre-determined output power from the resonant converter.

20 Claims, 6 Drawing Sheets

(51) Int. Cl.
*H02M 1/00* (2006.01)
*H02M 7/48* (2007.01)

(56) References Cited

U.S. PATENT DOCUMENTS

| | | | | |
|---|---|---|---|---|
| 6,856,519 B2* | 2/2005 | Lin | ................... | H02M 7/53806 |
| | | | | 315/307 |
| 8,520,409 B2* | 8/2013 | Harrison | ............. | H02M 1/4216 |
| | | | | 363/17 |
| 8,670,254 B2* | 3/2014 | Perreault | ............... | H02M 7/797 |
| | | | | 363/159 |
| 8,964,413 B2* | 2/2015 | Liu | ..................... | H02M 1/4225 |
| | | | | 363/17 |
| 2009/0251926 A1* | 10/2009 | Choi | ................. | H02M 3/33569 |
| | | | | 363/16 |
| 2011/0085354 A1 | 4/2011 | Wang et al. | | |
| 2012/0087157 A1* | 4/2012 | Huang | ................ | H02M 7/5387 |
| | | | | 363/37 |

OTHER PUBLICATIONS

PCT search opinion of the international searching authority PCT/US2013/074008, Jul. 2011.

* cited by examiner

METHOD AND APPARATUS FOR MODULATING LOWER POWERS IN RESONANT CONVERTERS

CROSS-REFERENCE TO RELATED APPLICATIONS

This application claims benefit of U.S. provisional patent application Ser. No. 61/735,438, entitled "Method and Apparatus for Modulating Low Powers in Resonant Converters" and filed Dec. 10, 2012, which is herein incorporated in its entirety by reference.

BACKGROUND OF THE INVENTION

1. Field of the Invention

Embodiments of the present disclosure relate generally to power conversion, and, in particular, to controlling power conversion in a resonant converter.

2. Description of the Related Art

Resonant converters provide many advantages over other types of power converters. Such advantages may include low noise, low component stress, low component count, and predictable conduction-dominated losses. Resonant converters may therefore be smaller, less costly and more efficient devices than other types of converters.

Most resonant converters use frequency modulation. In order to modulate very low powers, the converter must be operated at a very high frequency, making control of the converter more difficult and incurring higher switching losses than when operating at lower frequencies.

Therefore, there is a need in the art for a method and apparatus for efficiently operating a resonant converter to module low powers.

SUMMARY OF THE INVENTION

Method and apparatus for power conversion substantially as shown and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
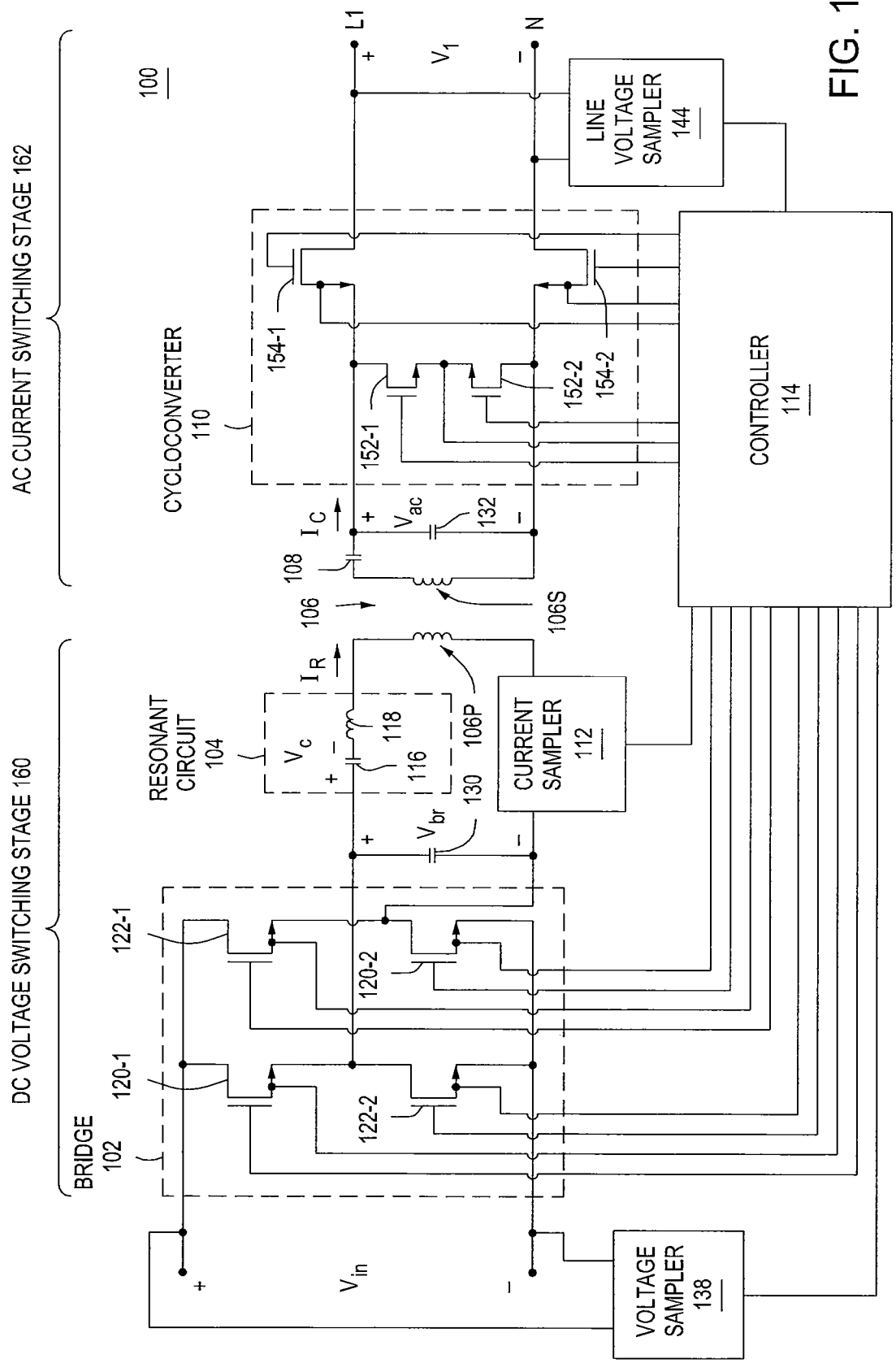
FIG. 1 is a block diagram of a resonant converter in accordance with one or more embodiments of the present invention.

FIG. 1 is a block diagram of a resonant converter 100 in accordance with one or more embodiments of the present invention. This diagram only portrays one variation of the myriad of possible system configurations. The present invention can function in a variety of power generation environments and systems.

The resonant converter 100 comprises an input bridge 102 coupled across a parallel input capacitor 130 and a series combination of a capacitor 116, an inductor 118, a primary winding 106P of a transformer 106, and a current sampler 112. Such components form a DC voltage switching stage 160 of the resonant converter 100. In some embodiments, at least a portion of the capacitance of the parallel input capacitor 130 may be due to parasitic capacitance from switching devices within the resonant converter 100.

The bridge 102 is a full H-bridge comprising switches 1201, 120-2, 122-1, and 122-2 (e.g., n-type metal-oxide-semiconductor field-effect transistors, or MOSFETs) arranged such that switches 120-1/120-2 and 122-1/122-2 form first and second diagonals, respectively, of the H-bridge. Gate terminals and source terminals of each of the switches 120-1, 120-2, 122-1, and 122-2 are coupled to a controller 114 for operatively controlling the switches. In other embodiments, the switches 120-1, 120-2, 122-1, and 122-2 may be any other suitable electronic switch, such as insulated gate bipolar transistors (IGBTs), bipolar junction transistors (BJTs), p-type MOSFETs, gate turnoff thyristors (GTOs), and the like. The bridge 102 is able to switch, for example, from 60 to 600 volts depending upon the DC voltage source to the bridge 102. In some other embodiments, the bridge 102 may be a half H-bridge rather than a full H-bridge.

A first output terminal of the bridge 102 is coupled between the switches 120-1 and 122-2, and is also coupled to a first terminal of the parallel input capacitor 130 and to a first terminal of the capacitor 116. A second terminal of the capacitor 116 is coupled to a first terminal of the inductor 118, and a second terminal of the inductor 118 is coupled to a first terminal of the primary winding 106P. The capacitor 116 and the inductor 118 form a series resonant circuit 104 having a frequency of, for example, 100 kilohertz (kHz); alternatively, the resonant circuit 104 may have a different resonant frequency. In some alternative embodiments, the inductor 118 may represent a leakage inductance of the transformer 106 rather than being a separate inductor, thereby reducing the overall component count of the resonant converter 100. In other alternative embodiments, other types of resonant circuits (e.g., parallel LC, series-parallel LLC, series-parallel LCC, series-parallel. LLCC, and the like) may be utilized within the resonant converter 100.

The current sampler 112 is coupled between a second terminal of the primary winding 106P and a second output terminal of the bridge 102 that is coupled between the switches 122-1 and 120-2. Additionally, a voltage sampler 138 is coupled across the input to the bridge 102; both the voltage sampler 138 and the current sampler 112 are coupled to the controller 114.

On the secondary side of the transformer 106, a first terminal of a secondary winding 106S is coupled to a first terminal of a capacitor 108. A second terminal of the capacitor 108 is coupled to a first terminal of a parallel output capacitor 132, and a second terminal of the parallel output capacitor 132 is coupled to a second terminal of the secondary winding 106S. A cycloconverter 110 is coupled across the parallel output capacitor 132 and forms an AC current switching stage 162 of the resonant converter 100. Through design selection of both the parallel input capacitor 130 and the parallel output capacitor 132, the resonant converter 100 can be designed such that it modulates over a wide range of power with a relatively small change in switching frequency of the bridge 102.

in some embodiments, the capacitor 116 may be on the order of 400 nanofarad (nF), the inductor 118 may be on the order of 4 microhenries (μH), the parallel input capacitor 130 may be on the order of 10 nF, the parallel output capacitor 132 may be on the order of 5 nF, and the transformer 106 may have a turns ratio of 1:6; such embodiments may have a frequency range of 150 kilohertz (kHz)—300 kHz. Generally, the series capacitance of the resonant circuit 104 may be on the order of 400 nF. For example, the capacitor 116 may be on the order of 400 nF and the capacitor 108 may be made extremely large such that it acts as a DC blocking capacitor. Alternatively, for a transformer turns ratio of 1:6, the capacitor 116 may be on the order of 800 nF and the capacitor 108 may be on the order of 22.2 nF (i.e., the capacitor 108 appears as a 800 nF capacitor in series with the capacitor 116 as a result of the transformer turns ratio).

The cycloconverter 110 comprises switches 152-1, 152-2, 154-1, and 154-2. A drain terminal of the switch 152-1 is coupled to the first terminal of the parallel output converter 132 and to a source terminal of the switch 154-1. Source terminals of the switches 152-1 and 152-2 are coupled together, and a drain terminal of the switch 152-2 is coupled to the second terminal of the output parallel capacitor 132 and a source terminal of the switch 154-2. Gate terminals and source terminals of each switch 152-1, 152-2, 154-1, and 154-2 are coupled to the controller 114 for operating (i.e., activating/deactivating) each of the switches. The switch pair 152-1/152-2 (i.e., the switches 152) forms a first four-quadrant switch and the switch pair 154-1/154-2 (i.e., the switches 154) forms a second four-quadrant switch. In some embodiments, the switches 152-1, 152-2, 154-1, and 154-2 may be n-type MOSFET switches; in other embodiments, other suitable switches and arrangements of switches may be utilized for the first and the second four-quadrant switches.

Drain terminals of the switches 154-1 and 154-2 are coupled to first and second output terminals, respectively, which in turn are coupled to lines L1 and N of a single-phase AC line, which may be a 60 Hz commercial power grid or a commercial grid at another frequency. A line voltage sampler 144 is coupled across the first and second output terminals for sampling the AC line voltage, and is also coupled to the controller 114.

In some alternative embodiments, the cycloconverter 110 may be a three-phase cycloconverter for coupling three-phase or split-phase AC output to an AC line, such as a commercial power grid.

During operation of the resonant converter 100, the bridge 102 receives an input voltage Vin from a DC voltage source, such as one or more renewable energy sources (e.g., photovoltaic (PV) modules, wind farms, hydroelectric systems, or the like), batteries, or any suitable source of DC power.

The controller 114 alternately activates/deactivates the H-bridge diagonals (i.e., 180° out of phase) to generate a bridge output voltage Vbr that is a bipolar square wave. The bridge output voltage Vbr results in a current Ir through the resonant circuit 104 and the primary winding 106P, thereby inducing an alternating current in the secondary winding 106S. The transformer 106 may be a step-up transformer for increasing the voltage from the primary to the secondary (for example, for a DC input generated by a PV module, the transformer 106 would generally be a step-up transformer) or, alternatively, a step-down transformer for decreasing the voltage.

As a result of the current induced in the secondary winding 106S, an approximately sinusoidal current waveform Ic flows into the cycloconverter 110; as the frequency increases farther beyond the resonant frequency, the current waveform Ic changes from an approximately sinusoidal waveform to an approximately triangular waveform. The amplitude of the current waveform Ic is controlled by the switching frequency of the bridge 102 and can be increased or decreased by suitably adjusting the bridge's switching frequency; i.e., the current and power) transferred varies as the signal frequency moves away from the resonant frequency of the resonant circuit 104. By raising the frequency above resonance, the effective impedance of the resonant circuit 104 is increased and the power decreases; by lowering the frequency closer to resonance, the resonant circuit effective impedance is decreased and the power increases. The controller 114 determines an output power required from the resonant controller 100 and the required output current Ireg to achieve that power, and adjusts the input bridge switching frequency as described further below to achieve the required output power. In some embodiments where the resonant converter 100 receives input power from a PV module, the controller 114 may determine the resonant converter required output power such that the PV module is biased at a maximum power point (MPP).

The current sampler 112 samples the current Ir and generates values indicative of the sampled current ("current samples"), while the voltage sampler 138 samples the voltage Vbr and generates values indicative of the sampled primary side voltage ("primary voltage samples"). The current sampler 112 and the voltage sampler 138 may each perform such sampling at a rate of, for example, 50 MHz. In some embodiments, the current sampler 112 and the voltage sampler 138 each comprise an analog-to-digital converter (ADC) for generating the samples in a digital format.

The current sampler 112 and the voltage sampler 138 respectively couple the current and primary voltage samples to the controller 114 which computes the generated power level based on the current and voltage samples. The controller 114 then compares the computed power level to the required output power level and adjusts the bridge switching frequency to increase or decrease the generated power as needed.

The controller 114 drives the cycloconverter 110 to selectively couple the received current waveform Ic to the AC line (i.e., to lines L1 and N) at the cycloconverter output based on the required resonant converter output power and the grid voltage waveform. The grid voltage waveform may be determined based on samples obtained by the line voltage sampler 144, for example at a rate of 30 kilosamples per second (kSPS), and coupled to the controller 114; in some embodiments, the line voltage sampler 144 comprises an ADC for generating the samples in a digital format. In some embodiments, i.e., for a power factor of 1, the resonant converter output is generated in phase with the line voltage;

in other embodiments where reactive power is being produced by the resonant converter 100, e.g., for providing Volt-Ampere-Reactive (VAR) compensation, the resonant converter output is generated out of phase with the line voltage. In some embodiments, the switches within the bridge 102 and or the cycloconverter 110 may be operated in a zero-voltage switching (ZVS) mode for improved efficiency.

During a normal operating mode, the bridge 102 and the cycloconverter 110, which operate at the same frequency, may operate at a switching speed on the order of the resonant circuit's resonant frequency, for example 100 kHz. One example of a normal operating mode for the resonant converter 100 may be found in co-pending, commonly assigned U.S. patent application Ser. No. 13/342,368, entitled "Method and Apparatus for Resonant Power Conversion" and filed Jan. 3, 2012, which is herein incorporated by reference in its entirety.

In accordance with one or more embodiments of the present invention, the resonant converter 100 operates in a "ring" mode when modulating low powers that would otherwise require very high frequency operation of the resonant converter 100. In some embodiments, the controller 114 may switch from normal operating mode to ring mode when a computed switching frequency for normal mode operation exceeds a threshold (referred to as a "ring mode threshold"). For example, if a switching frequency greater than a ring mode threshold of 500 kHz would be required to continue in the normal operating mode (for example when operating the converter 100 at less than 1% of full power), the resonant converter 100 switches from normal mode to ring mode. The resonant converter 100 may subsequently return to the normal operating mode once the required switching frequency for normal operating mode is below the ring mode threshold. In some embodiments, pre-computed information based at least on frequency is stored in a look-up table for determining the operating mode.

During ring mode, the resonant converter switches are held in particular switching state over one or more full resonant periods (referred to as "ring periods") plus a fraction of the subsequent resonant period in order to achieve a positive energy transfer through the resonant converter 100. During the holding ring periods, energy is transferred back and forth between the primary and secondary sides of the resonant converter 100, resulting in zero net-energy transfer. After the determined number of holding ring periods, during which there is zero net-energy/charge transfer, the switches are allowed to sequence such that an appropriate amount of charge is transferred to generate the desired power out. For example, for a resonant frequency of 100 kHz, the converter switches may be held in a first switching state (e.g., bridges switches 120-1/120-2 activated and 122-1/122-2 deactivated; cycloconverter switches 154-1/154-2 activated and one or both of 152-1/152-2 deactivated) over one full resonant (ring) period of 10 microsecond (μsec) plus, an additional 1 μsec, after which the bridge switches switch states, followed shortly (e.g., at the tank zero current crossing, which is typically less than 1 μsec after the input bridge switches states) by the cycloconverter switches switching states, thereby resulting in the same net-energy transfer through the resonant converter 100 as if the converter switches were operated in the first switching state for only 1 μsec. The converter switches may then be switched to the next switching state (e.g., bridges switches 120-1/120-2 deactivated and 122-1/122-2 activated; one or both of the cycloconverter switches 154-1/154-2 deactivated and 152-1/152-2 activated) and held in such state for another 11 μsec, resulting in the same net-energy transfer through the resonant converter 100 as if the bridge switches were operated in such switching state for only 1 μsec.

When switching from normal operating mode to ring mode, the controller 114 determines, for example as described further below with respect to FIG. 5, a number of full ring periods over which the converter switches should be held (i.e., the number of holding ring periods). After holding the converter switches in a particular switching state over the designated number of holding ring periods, the controller 114 continues to maintain the converter switches in such state until sufficient energy is transferred through the resonant converter 100 to achieve the desired output power. The controller 114 then switches the converter switches to the next switching state. For example, the controller 114 may constantly monitor the tank energy in real time (e.g., at a sampling rate on the order of 25 MHz) and switch at a time when the tank energy relative to the bridge voltages crosses a threshold, where the threshold is pre-computed to deliver a desired power transfer. In some embodiments, the controller 114 may determine a number of holding ring periods each time the converter switching state is changed. Once the ring cycles have been completed, the DC and AC switches are free to sequence as they would in normal operation, but they do not change at the same time. Typically, the DC bridge switches will change before the cycloconverter AC switches; however, in one or more other embodiments where power flow is from the AC side to the DC side, the AC switches would switch first.

By holding the converter switches in a single switching state over one or more ring periods plus an additional fractional ring period, the resonant converter 100 is able to operate at very low output powers without requiring very high switching frequencies, resulting in easier system control as well as reduced switching losses.

In one or more other embodiments, the resonant converter 100 may interleave two or more power stages, switch among additional modes of operation, and/or employ a burst technique where energy from the DC input is stored during one or more line voltage cycles and subsequently coupled (i.e., "bursted") to the AC line during a burst period of one or more line voltage cycles.

Figure 2:
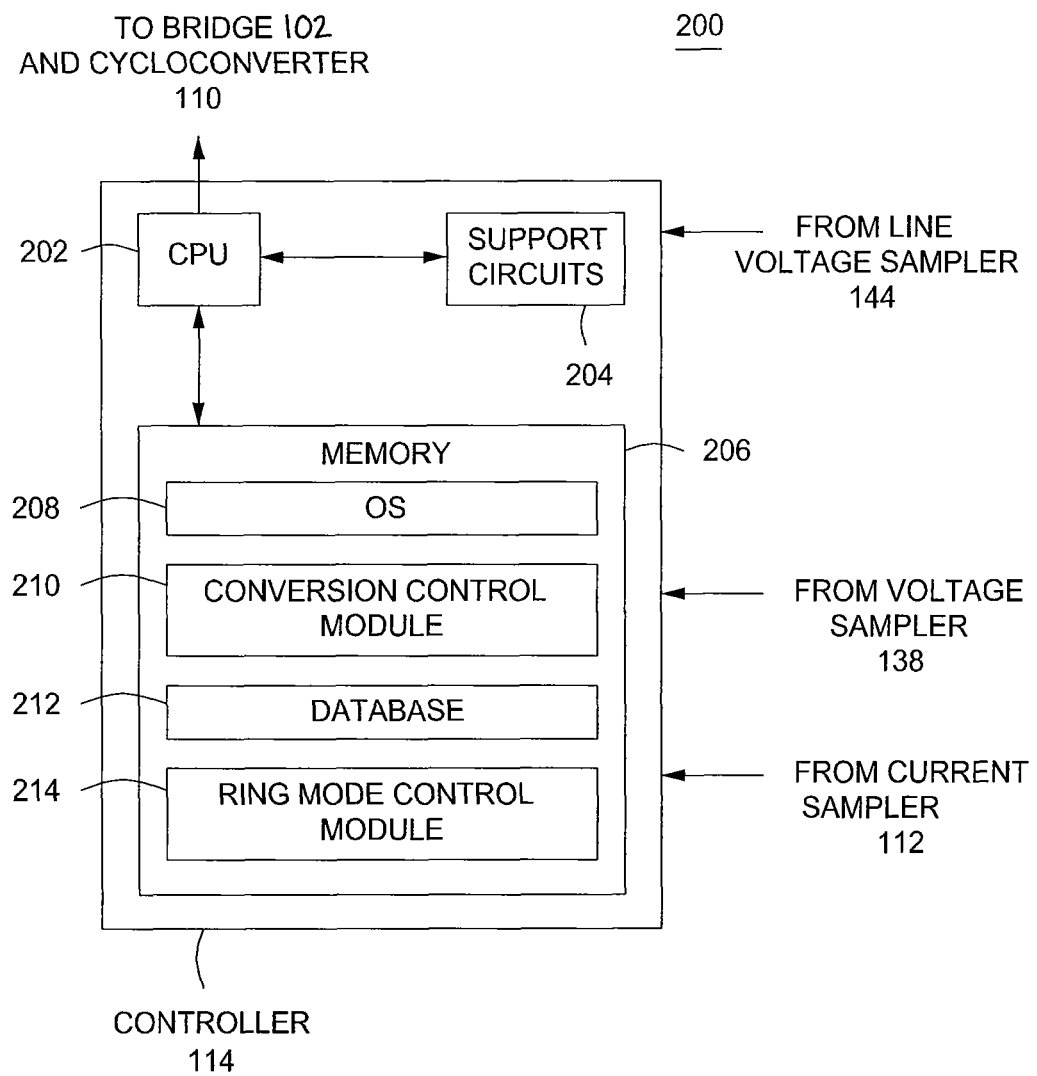
FIG. 2 is a block diagram of a controller in accordance with one or more embodiments of the present invention.

FIG. 2 is a block diagram of a controller 114 in accordance with one or more embodiments of the present invention. The controller 114 may be comprised of hardware, software, or a combination thereof and comprises support circuits 204 and a memory 206, each coupled to a central processing unit (CPU) 202. The CPU 202 may comprise one or more conventionally available processors, microprocessors, microcontrollers and/or combinations thereof configured to execute non-transient software instructions to perform various tasks in accordance with the present invention; alternatively, the CPU 202 may include one or more application specific integrated circuits (ASICs). The support circuits 204 are well known circuits used to promote functionality of the CPU 202. Such circuits include, but are not limited to, a cache, power supplies, clock circuits, buses, input/output (I/O) circuits, and the like. The controller 114 may be implemented using a general purpose computer that, when executing particular software, becomes a specific purpose computer for performing various embodiments of the present invention.

The memory 206 may comprise random access memory, read only memory, removable disk memory, flash memory, and various combinations of these types of memory. The memory 206 is sometimes referred to as main memory and may, in part, be used as cache memory or buffer memory.

The memory 206 generally stores the operating system (OS) 208, if necessary, of the controller 114 that can be supported by the CPU capabilities.

The memory 206 may store various forms of application software, such as a conversion control module 210 for controlling operation of the resonant converter 100 during normal operating mode. For example, the controller 114 executes the conversion control module 210 during normal operating mode to convert received input power to output power and, in some embodiments where a PV module is coupled at the input of the resonant converter 100, to operate the PV module at its maximum power point (MPP).

The memory 206 may also store a ring mode control module 214 for controlling operation of the resonant converter 100 with respect to ring mode. For example, the controller 114 executes the ring mode control module 214 for determining when to switch the resonant converter 100 to/from ring mode and operating the resonant converter 100 in ring mode (e.g., determining one or more numbers of ring periods for holding the converter switches in a particular switching state; determining when sufficient energy has been transferred through the resonant converter 100 subsequent to holding the converter switches for a designated number of ring periods; and the like). In some embodiments, the conversion control module 210 and the ring mode control module 214 may be combined into a single module.

The memory 206 may additionally store a database 212 for storing data related to the operation of the resonant converter 100 and/or the present invention (e.g., data such as one or more designated number of holding ring periods for holding the converter switches in a particular state, one or more algorithms (such as a minimum charge transfer algorithm, a maximum frequency limit, or the like) for determining a number of holding ring periods, pre-computed information for determining whether to operate in the normal or the ring mode, and the like).

Further detail on the functionality provided by the controller 114 is described below with respect to FIGS. 4 and 5.

In one or more other embodiments, the CPU 202 may be a microcontroller comprising internal memory for storing controller firmware that, when executed, provides the controller functionality, for example as previously described and further described below with respect to FIGS. 4 and 5.

Figure 3:
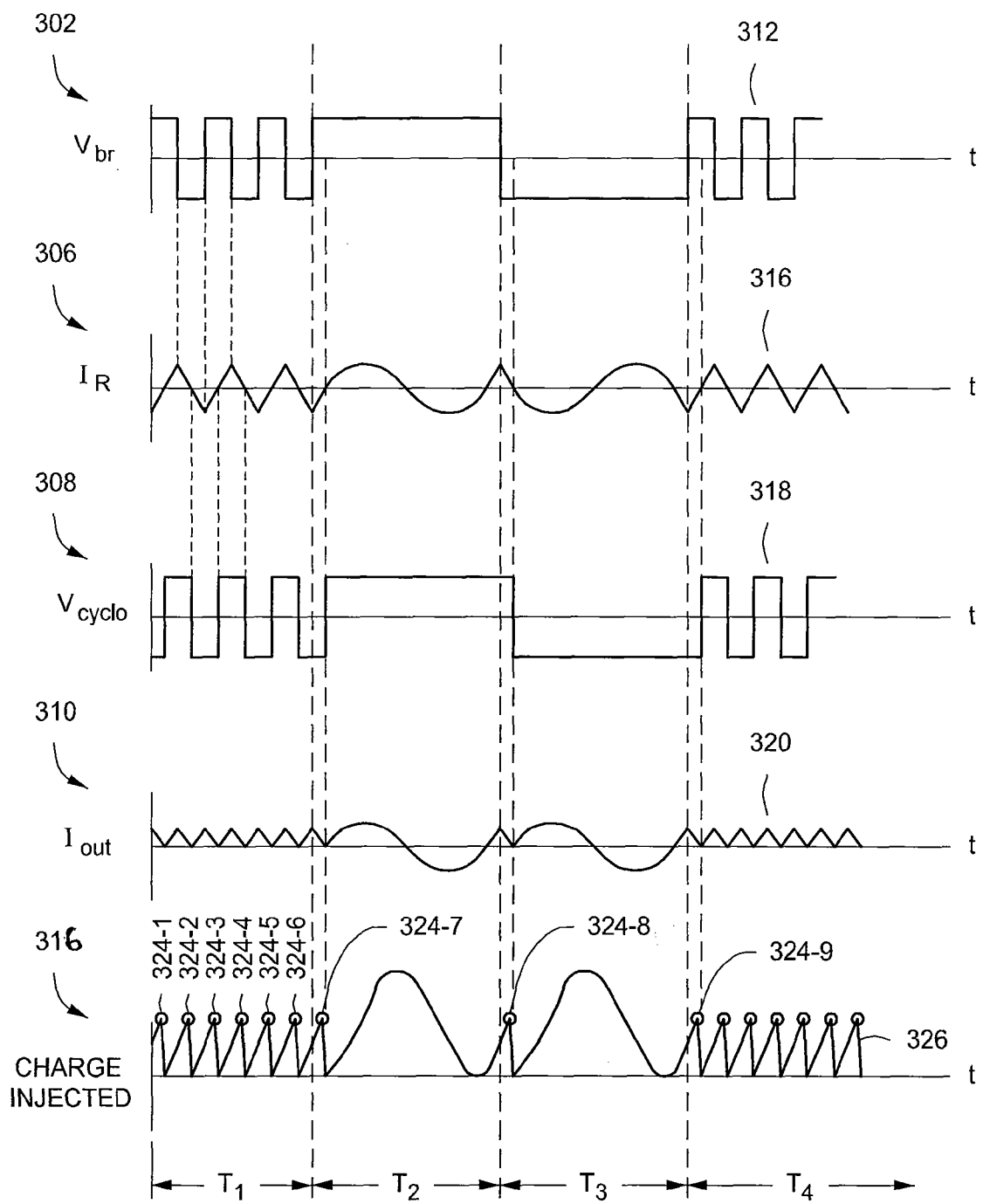
FIG. 3 is a timing diagram in accordance with one or more embodiments of the present invention.

FIG. 3 is a timing diagram 300 in accordance with one or more embodiments of the present invention. The timing diagram 300 comprises a graph 302 depicting a waveform 312 of the bridge voltage Vbr over time ("bridge voltage waveform 312"); a graph 306 depicting a waveform 316 of the resonant circuit current Ir ("tank current waveform 316"); a graph 308 depicting a waveform 318 of the voltage Vcyclo across the secondary winding 106S ("secondary voltage waveform 318"); a graph 310 depicting a waveform 320 of the current injected onto L1 at the output of the resonant converter 100 ("output current waveform 320"); and a graph 316 depicting a waveform 326 of the charge C injected onto L1 at the output of the resonant converter 100 ("injected charge waveform 326").

During a first time interval T1, the resonant converter 100 operates in a normal operating mode. In some embodiments, the resonant converter 100 may operate in normal operating mode when required switching frequencies are less than 500 kHz. During the time interval T1, the bridge voltage waveform 312 is a bipolar square wave, the tank current waveform 316 is an approximately triangular waveform (as the frequency becomes higher, the tank current waveform 316 becomes more triangular than sinusoidal), and the secondary voltage waveform 318 is a bipolar square wave phase-shifted from the bridge voltage waveform 312. Each of the aforementioned waveforms has a frequency the same as the resonant converter switching frequency, which may be proximate 500 kHz in some embodiments, and a DC value of zero.

Additionally during the time interval T1, the output current waveform 320 is an approximately triangular waveform having a DC value one-half of its peak-to-peak amplitude and a frequency twice that of the tank current waveform 316. The injected charge waveform 326 is an approximately sinusoidal waveform having a DC value one-half of its peak-to-peak amplitude and a frequency the same as the output current waveform 320. The injected charge waveform 326 is marked with indicia 324 indicating points at which the same overall charge is transferred to the resonant converter output; i.e., during T1, the charge transferred during the period from 324-1 to 324-2 is the same as the charge transferred during the period 324-2 to 324-3, which is the same as the charge transferred during the period 324-3 to 324-4, etc.

At the start of a time interval T2, the resonant converter 100 switches to ring mode, for example when the resonant converter switching frequency during normal operating mode would be required to exceed 500 kHz to modulate low power. During the interval T2, the bridge voltage waveform 312 has a constant positive value and the tank current waveform 316 changes from an approximately triangular waveform to a nearly-perfect sinusoidal waveform having a frequency twice that of the bridge voltage waveform 312. At the time marked by indicia 324-7 on waveform 326, the secondary voltage waveform 318 transitions from a low value to a high value, and remains high for the rest of the time interval T2.

From the start of T2 to the time marked by indicia 324-7 on waveform 326, the output current waveform 320 falls to zero and for the remainder of T2 is a nearly-perfect sinusoidal waveform having a frequency twice that of the bridge voltage waveform 312. The injected charge waveform 326 continues to rise until the time marked by indicia 324-7, where it drops to zero and for the remainder of T2 is an approximately sinusoidal waveform having a DC value of half its peak-to-peak amplitude where its peak-to-peak amplitude is greater than during the time interval T1 (e.g., its peak-to-peak amplitude is proportional to instantaneous tank energy at the start of the ring cycle). The frequency of the injected charge waveform 326 is the same as that of the output current waveform 320. As the injected charge waveform 326 rises to its peak value, charge is injected in; as the injected charge waveform 326 falls from its peak value, charge is pulled out. As depicted by the indicia 324, the same amount of charge is transferred during the period from 324-6 to 324-7 as during the period from 324-5 to 324-6.

At the start of a time interval T3, the bridge voltage waveform 312 changes to a low value and has a constant negative value throughout T3. The charge injection continues until the time marked by indicia 324-8 on waveform 326, at which point the same amount of charge has transferred during the period from 324-7 to 324-8 as during the period from 324-6 to 324-7. During T3, the tank current waveform 316 is a nearly-perfect sinusoidal waveform that is a mirror image of the tank current waveform 316 during the interval T2 (i.e., the tank current waveform 316 during the interval T3 is equivalent to an inversion of the tank current waveform 316 that occurs during the interval T2). At the time marked by indicia 324-8 on waveform 326, the secondary voltage waveform 318 transitions from a high value to a low value, and remains low for the rest of the time interval T3.

The output current waveform 320 is the same during the interval T3 as during the interval T2 and has a value of zero at the time marked by indicia 324-8. The injected current waveform 326 is the same during the interval T3 as during the interval T2.

The charge injection continues following the start of a time interval T4 until the time marked by indicia 324-9 on waveform 326, at which point the same amount of charge has been transferred during the period from 324-8 to 324-9 as during the period from 324-7 to 324-8. Once the number of number of ring cycles has been completed, i.e., following the time marked by indicia 324-9 on waveform 326, the DC and AC switches are free to sequence as they would in normal operation, but they do not change at the same time. Typically, the DC bridge switches will change before the cycloconverter AC switches; however, in one or more other embodiments where power flow is from the AC side to the DC side, the AC switches would switch first. The resonant converter returns to operating in the normal operating mode.

At the start of T4, the bridge voltage waveform 312 transitions from a low to a high value, and throughout T4 the bridge voltage waveform 312 is a bipolar square wave having a much greater frequency than during the intervals T2 and T3 a frequency proximate its frequency during the time interval T1). The tank current waveform 316 is an approximately triangular waveform having the same frequency as the bridge voltage waveform 312. At the time marked by indicia 324-9, the secondary voltage waveform 318 transitions from a low to a high value, and through the remainder of T4 is a bipolar square wave having the same frequency as the bridge voltage waveform 312.

The output current waveform 320 becomes an approximately triangular waveform having a DC value of half its peak-to-peak amplitude and a frequency twice that of the tank current waveform 316. The injected charge waveform 326 is an approximately sinusoidal waveform having a DC value of half its peak-to-peak amplitude (which is less than during the interval T3) and a frequency the same as the output current waveform 320.

Figure 4:
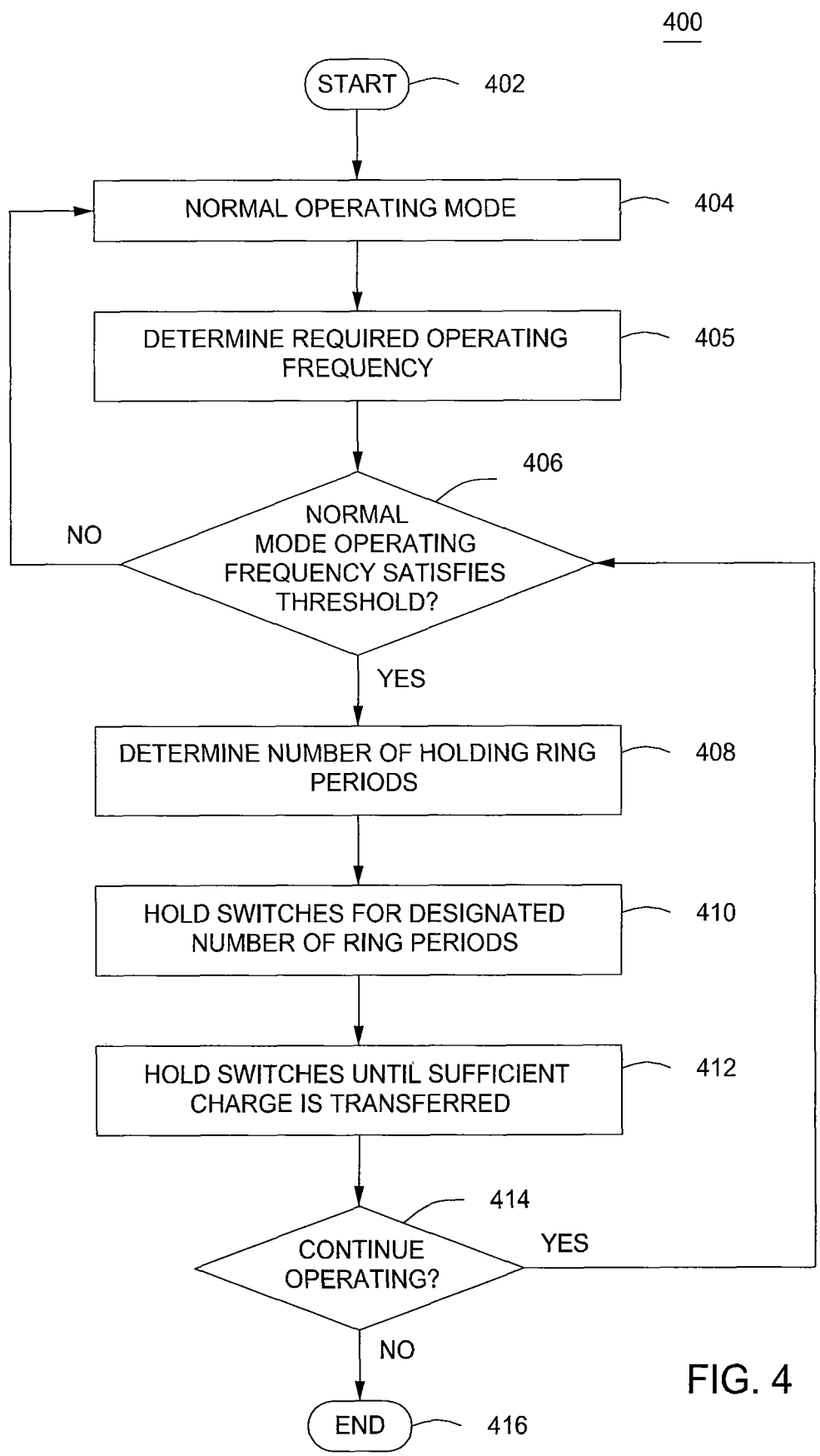
FIG. 4 is a flow diagram of a method for operating a resonant converter in ring mode in accordance with one or more embodiments of the present invention.

FIG. 4 is a flow diagram of a method 400 for operating a resonant converter in ring mode in accordance with one or more embodiments of the present invention. The resonant converter comprises an input bridge for receiving a DC input and a cycloconverter (e.g., a full-bridge cycloconverter or a half-bridge cycloconverter) for generating the AC output. In some embodiments, the resonant converter may be the resonant converter 100; in other embodiments, the resonant converter may generate a split-phase or three-phase output, and/or may comprise a different type of resonant circuit than the resonant converter 100 (e.g., parallel LC, series-parallel LLC, series-parallel LCC, series-parallel LLCC, or the like). In certain embodiments the resonant converter may have a full H-bridge at its DC input, while in other embodiments the input bridge may be a half H-bridge.

The method 400 starts at step 402 and proceeds to step 404. At step 404, the resonant converter is operated in a normal operating mode for converting a received DC power to an AC power as previously described. During the normal operating mode, the resonant converter is generally operated at a switching speed on the order of the converter's resonant frequency, for example 100 kHz. At step 405, the required switching frequency to achieve a required output power while continuing to operate in the normal mode is determined as previously described. At step 406, a determination is made whether the operating frequency for normal mode satisfies a threshold. In some embodiments where the resonant converter has a resonant frequency on the order of 100 kHz, the threshold may be of 500 kHz (e.g., for operating the converter at less than 1% of full power). If the result of the determination at step 406 is no, the method 400 returns to step 404 and the converter continues operating in the normal mode at the determined operating frequency; if the result of the determination at step 406 is yes, the method 400 proceeds to step 408.

At step 408, a number of holding ring periods for maintaining the converter switches in a first state is determined; in some embodiments, a minimum charge transfer algorithm may be used to determine the number of holding ring periods, for example as described below with respect to FIG. 5. The method 400 proceeds to step 410, where the converter switches are switched to the next appropriate switching state and held in such state for the designated number of holding ring periods. For example, for the resonant converter 100, the converter switches may be held in a first switching state where the bridge switches 120-1/120-2 are activated and 122-11122-2 deactivated, and the cycloconverter switches 154-1/154-2 are activated and one or both of 152-1/152-2 deactivated. In one embodiment where the resonant converter has a resonant frequency of 100 kHz, the converter switches may be held in the first switching state over one holding ring period of 10 microsecond (μsec) during which there is zero net-energy/charge transfer.

At step 412, the switches are further held in the same switching state until sufficient charge has been transferred to achieve the desired power out. Once the ring cycles have been completed, the DC and AC switches are free to sequence as they would in normal operation, but they do not change at the same time. Typically, the DC bridge switches will change before the cycloconverter AC switches; however, in one or more other embodiments where power flow is from the AC side to the DC side, the AC switches would switch first. In some embodiments, pre-computed information based on frequency and a minimum charger transfer per period is stored in a look-up table for determining the operating mode. The method 400 then proceeds to step 414.

At step 414, a determination is made whether to continue operating the converter. If the result of the determination at step 414 is yes, the method 400 returns to step 416. If the result of the determination at step 414 is no, the method 400 proceeds to step 418 where it ends.

Figure 5:
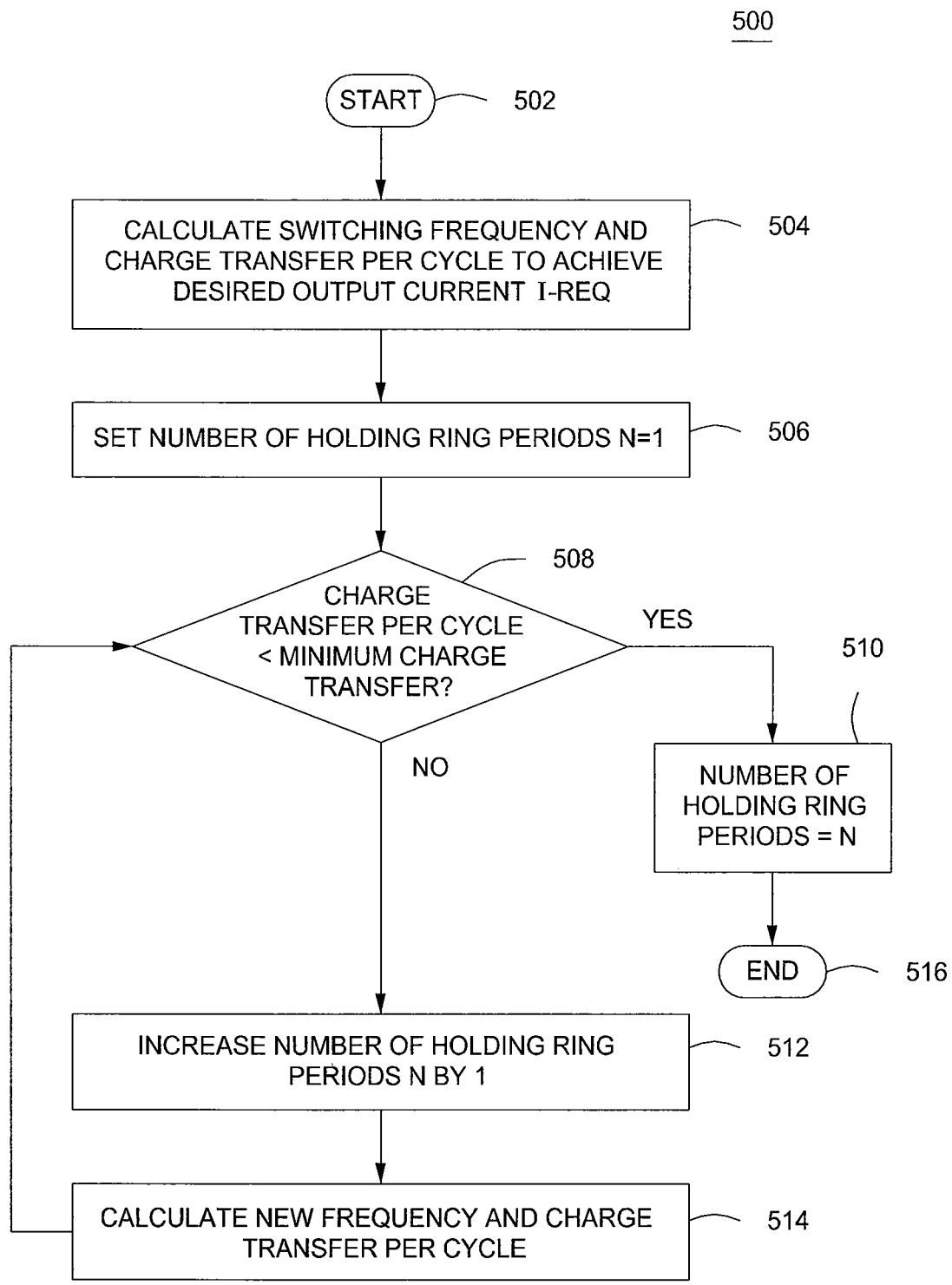
FIG. 5 is a flow diagram of a method for determining a number of holding ring periods in accordance with one or more embodiments of the present invention.

FIG. 5 is a flow diagram of a method 500 for determining a number of holding ring periods in accordance with one or more embodiments of the present invention. The method 500 may be used in one embodiment of the method 400, previously described, for determining a number of holding ring periods at step 408 of the method 400.

The method 500 starts at step 502 and proceeds to step 504. At step 504, the switching frequency and charge transfer per cycle are calculated to achieve a required output current Ireq to be generated by a resonant converter (e.g., the resonant converter 100). The method 500 proceeds to step 506, where a value representing a number of holding ring periods to be implemented (i.e., a number of ring periods for which the converter switches will be held in a particular switching state) is set to 1. At step 508, a determination is made whether the calculated charge transfer per cycle is less than a minimum charge transfer. In some embodiments, the minimum charge transfer is derived from the devices used for the switches; in order to maintain accuracy, the charge delivery per cycle should always be significantly larger than the output charge of the devices. If the result of the determination made at step 508 is no, the method 500 proceeds to step 512.

At step 512, holding ring periods value N is increased by 1 and the method 500 proceeds to step 514. At step 514, the new input bridge switching frequency and charge transfer per cycle to achieve a required Ireq are calculated based on the current holding ring periods value N. The method 500 then returns to step 508.

If the result of the determination at step 508 is yes, that the charge transfer per cycle is less than the minimum charge transfer, the method 500 proceeds to step 510, and the number of holding ring periods to be used is set to the value N. The method 500 then proceeds to step 516 where it ends.

Figure 6:
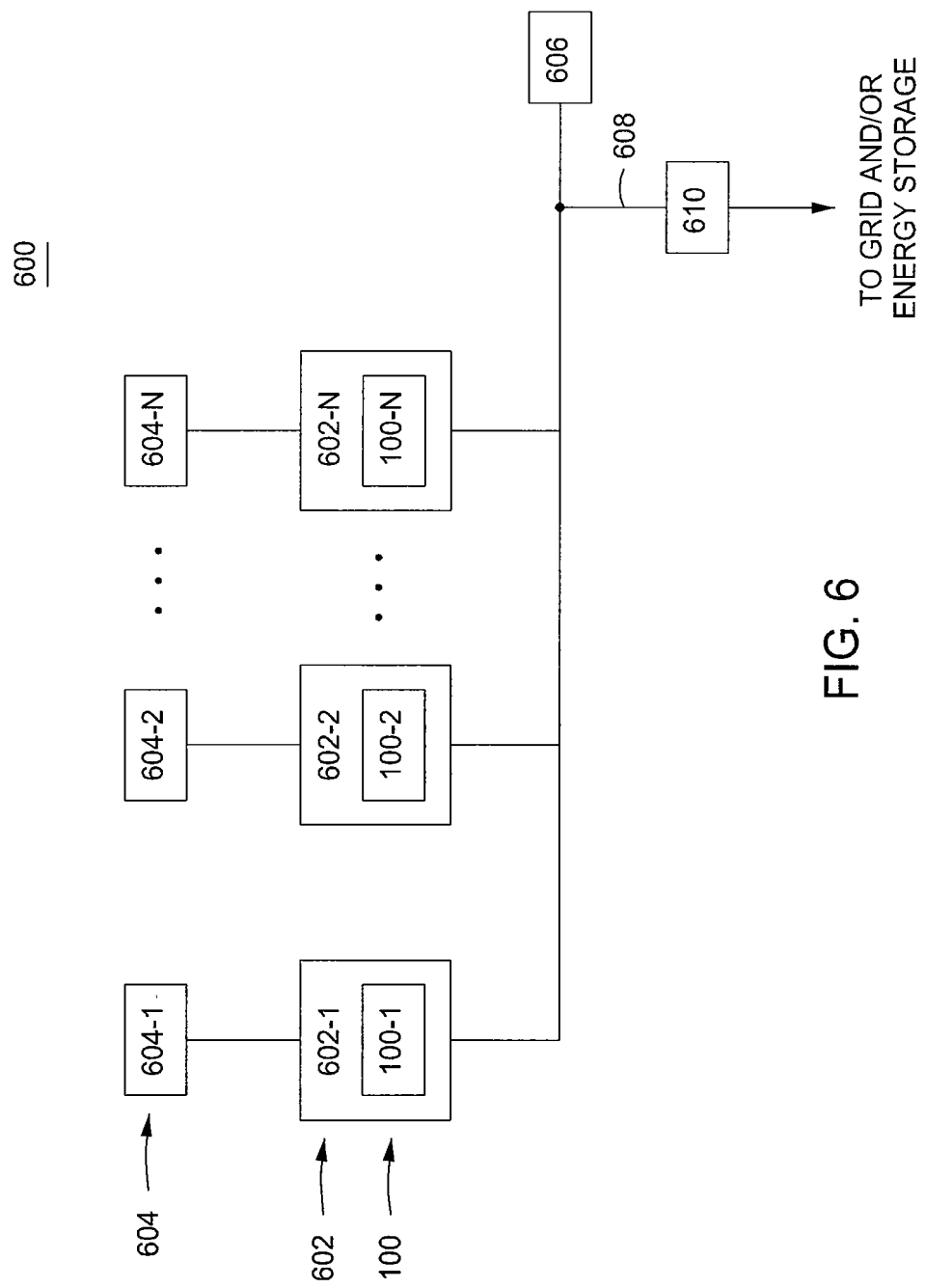
FIG. 6 is a block diagram of a system for power conversion comprising one or more embodiments of the present invention.

FIG. 6 is a block diagram of a system 600 for power conversion comprising one or more embodiments of the present invention. This diagram only portrays one variation of the myriad of possible system configurations and devices that may utilize the present invention. The present invention can be utilized in any system or device that uses a resonant converter.

The system 600 comprises a plurality of power converters 602-1, 602-2 . . . 602-N, collectively referred to as power converters 602; a plurality of DC power sources 604-1, 604-2 . . . 604-N, collectively referred to as DC power sources 604; a system controller 606; a bus 608; and a load center 610. The DC power sources 604 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each power converter 602-1, 602-2 . . . 602-N is coupled to a single DC power source 604-1, 604-2 . . . 604-N, respectively; in some alternative embodiments, multiple DC power sources 604 may be coupled to a single power converter 602, for example a single centralized power converter 602. Each of the power converters 602 comprises a resonant converter 100 (i.e., the power converters 602-1, 602-2 . . . 602-N comprise the resonant converters 100-1, 100-2 . . . 100-N, respectively) utilized during power conversion. Each of the resonant converters 100-1, 100-2 . . . 100-N employs the ring mode operating technique previously described. In some embodiments, the power converters 602 may generate a single phase AC power output; in other embodiments, the power converters 602 may generate a split-phase or three-phase AC output.

The power converters 602 are coupled to the system controller 606 via the bus 608. The system controller 606 is capable of communicating with the power converters 602 by wireless and/or wired communication (e.g., power line communications) for providing operative control of the power converters 602. The power converters 602 are further coupled to the load center 610 via the bus 608.

The power converters 602 are each capable of converting the received DC power to AC power, although in other embodiments the power converters may receive an AC input and convert the received input to a DC output. The power converters 602 couple the generated output power to the load center 610 via the bus 608. The generated power may then be distributed for use, for example to one or more appliances, and/or the generated energy may be stored for later use, for example using batteries, heated water, hydro pumping, H$_2$O-to-hydrogen conversion, or the like. In some embodiments, the power converters 602 convert the DC input power to AC power that is commercial power grid compliant and couple the AC power to the commercial power grid via the load center 610.

In some alternative embodiments, the power converters 602 may be DC-DC power converters; in other alternative embodiments, the power converters 602 may receive an AC input and be AC-AC converters (e.g., AC-AC matrix converters). In certain embodiments, the system 600 may be a serially connected micro-inverter (SCMI) system, for example with SCMI redundancy management. In each of such embodiments, the resonant converter 100 of the power converter 602 employs the ring mode operation as needed.

The foregoing description of embodiments of the invention comprises a number of elements, devices, circuits and/or assemblies that perform various functions as described. These elements, devices, circuits, and/or assemblies are exemplary implementations of means for performing their respectively described function.

While the foregoing is directed to embodiments of the present invention, other and further embodiments of the invention may be devised without departing from the basic scope thereof, and the scope thereof is defined by the claims that follow.

The invention claimed is:

1. A method for power conversion, comprising:
   operating a resonant converter in a ring mode comprising:
   holding a plurality of switches of the resonant converter in a first switching state throughout a pre-determined number of resonant periods, wherein the pre-determined number of resonant periods is one or more full resonant periods; and
   maintaining the plurality of switches in the first switching state for a fraction of a subsequent resonant period until an amount of energy has been transferred through the resonant converter to achieve a pre-determined output power from the resonant converter.

2. The method of claim 1, further comprising, prior to operating the resonant converter in the ring mode:
   operating the resonant converter in a normal mode for converting a first power to a second power;
   computing a switching frequency for operating the resonant converter in the normal mode; and
   comparing the computed switching frequency to a threshold, wherein the resonant converter switches from operating in the normal mode to operating in the ring mode when the computed switching frequency exceeds the threshold.

3. The method of claim 1, further comprising, prior to holding the plurality of switches in the first switching state, computing the pre-determined number of resonant periods.

4. The method of claim 3, wherein the pre-determined number of resonant periods is computed using a minimum charge transfer algorithm.

5. The method of claim 3, further comprising, after maintaining the plurality of switches in the first switching state for the fraction of the subsequent resonant period:
   switching the plurality of switches to a second switching state;
   holding the plurality of switches in the second switching state throughout a second pre-determined number of resonant periods; and
   maintaining the plurality of switches in the second switching state for a fraction of a resonant period subsequent to the second pre-determined number of resonant periods until a second amount of energy has been transferred through the resonant converter to achieve a second pre-determined output power from the resonant converter.

6. The method of claim 2, further comprising:
computing a second switching frequency for operating the resonant converter in the normal mode;
comparing the second switching frequency to the threshold; and
switching from operating the resonant converter in the ring mode to operating in the normal mode when the second switching frequency is less than the threshold.

7. The method of claim 2, wherein the resonant converter has a resonant frequency on the order of 100 kilohertz (KHz) and the threshold is on the order of 500 KHz.

8. Apparatus for power conversion, comprising:
a resonant converter controller for operating a resonant converter in a ring mode comprising:
holding a plurality of switches of the resonant converter in a first switching state throughout a pre-determined number of resonant periods, wherein the pre-determined number of resonant periods is one or more full resonant periods; and
maintaining the plurality of switches in the first switching state for a fraction of a subsequent resonant period until an amount of energy has been transferred through the resonant converter to achieve a pre-determined output power from the resonant converter.

9. The apparatus of claim 8, wherein, prior to operating the resonant converter in the ring mode, the resonant converter controller operates the resonant converter in a normal mode for converting a first power to a second power, computes a switching frequency for operating the resonant converter in the normal mode, compares the computed switching frequency to a threshold, and switches operation of the resonant converter from the normal mode to the ring mode when the computed switching frequency exceeds the threshold.

10. The apparatus of claim 8, wherein, prior to holding the plurality of switches in the first switching state, the resonant converter controller computes the pre-determined number of resonant periods.

11. The apparatus of claim 10, wherein the pre-determined number of resonant periods is computed using a minimum charge transfer algorithm.

12. The apparatus of claim 10, wherein, after maintaining the plurality of switches in the first switching state for the fraction of the subsequent resonant period, the resonant converter controller switches the plurality of switches to a second switching state, holds the plurality of switches in the second switching state throughout a second pre-determined number of resonant periods, and maintains the plurality of switches in the second switching state for a fraction of a next resonant period until a second amount of energy has been transferred through the resonant converter to achieve a second pre-determined output power from the resonant converter.

13. The apparatus of claim 9, wherein the resonant converter controller further computes a second switching frequency for operating the resonant converter in the normal mode, compares the second switching frequency to the threshold, and switches the resonant converter from operating in the ring mode to operating in the normal mode when the second switching frequency is less than the threshold.

14. The apparatus of claim 9, wherein the resonant converter has a resonant frequency on the order of 100 kilohertz (KHz) and the threshold is on the order of 500 KHz.

15. A system for power conversion, comprising:
a photovoltaic (PV) module; and
a resonant converter, coupled to the PV module, comprising:
a plurality of switches; and
a resonant converter controller for operating the resonant converter in a ring mode comprising (i) holding the plurality of switches in a first switching state throughout a pre-determined number of resonant periods, wherein the pre-determined number of resonant periods is one or more full resonant periods, and (ii) maintaining the plurality of switches in the first switching state for a fraction of a subsequent resonant period until an amount of energy has been transferred through the resonant converter to achieve a pre-determined output power from the resonant converter.

16. The system of claim 15, wherein, prior to operating the resonant converter in the ring mode, the resonant converter controller operates the resonant converter in a normal mode for converting a first power to a second power, computes a switching frequency for operating the resonant converter in the normal mode, compares the computed switching frequency to a threshold, and switches operation of the resonant converter from the normal mode to the ring mode when the computed switching frequency exceeds the threshold.

17. The system of claim 15, wherein, prior to holding the plurality of switches in the first switching state, the resonant converter controller computes the pre-determined number of resonant periods.

18. The system of claim 17, wherein the pre-determined number of resonant periods is computed using a minimum charge transfer algorithm.

19. The system of claim 17, wherein, after maintaining the plurality of switches in the first switching state for the fraction of the subsequent resonant period, the resonant converter controller switches the plurality of switches to a second switching state, holds the plurality of switches in the second switching state throughout a second pre-determined number of resonant periods, and maintains the plurality of switches in the second switching state for a fraction of a next resonant period until a second amount of energy has been transferred through the resonant converter to achieve a second pre-determined output power from the resonant converter.

20. The system of claim 17, wherein the resonant converter controller further computes a second switching frequency for operating the resonant converter in the normal mode, compares the second switching frequency to the threshold, and switches the resonant converter from operating in the ring mode to operating in the normal mode when the second switching frequency is less than the threshold.

* * * * *